March 10, 1942.  L. E. GATIEN  2,275,622
VEHICLE HEATER
Filed March 4, 1940  2 Sheets-Sheet 1
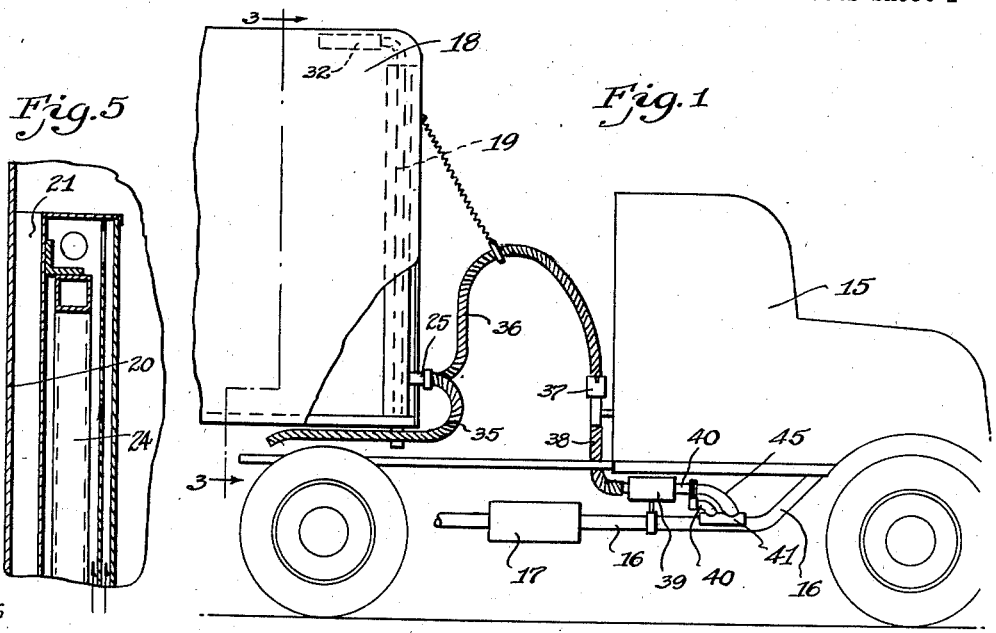
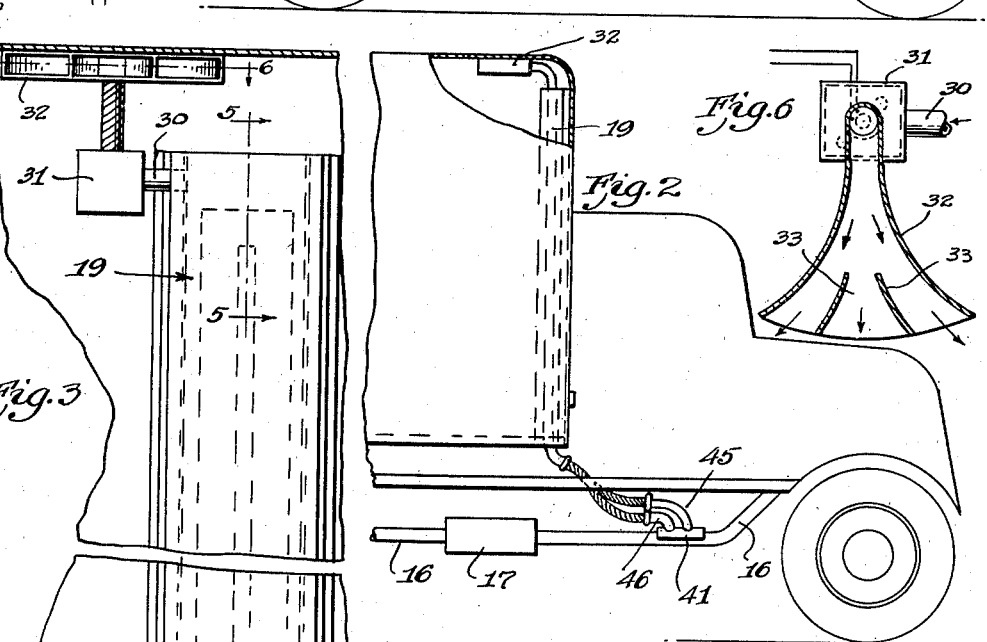
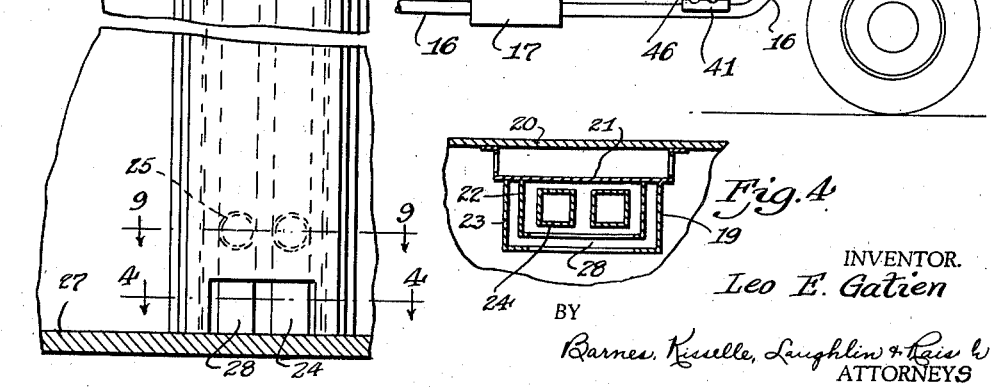
INVENTOR.
Leo E. Gatien
BY Barnes, Kisselle, Laughlin & Raisch
ATTORNEYS March 10, 1942.  L. E. GATIEN  2,275,622
VEHICLE HEATER
Filed March 4, 1940   2 Sheets-Sheet 2
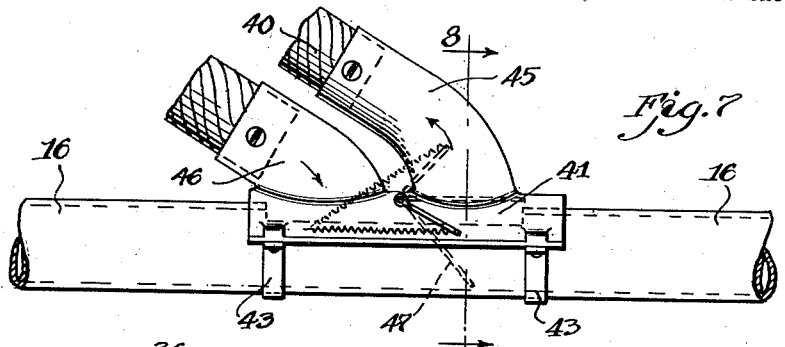
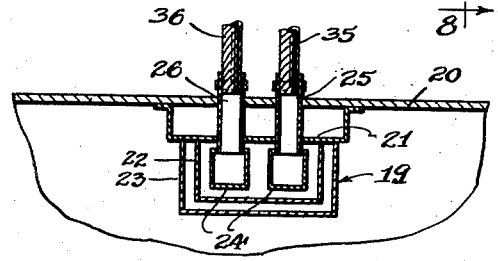
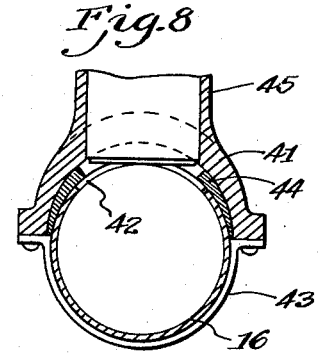
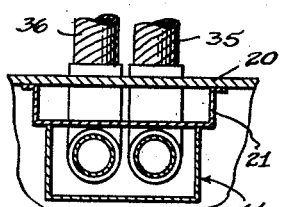
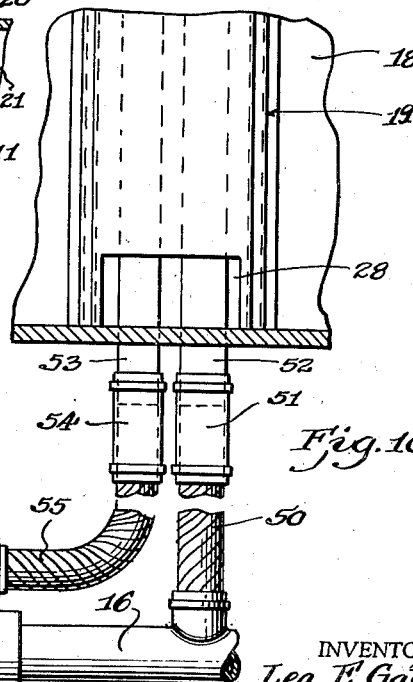
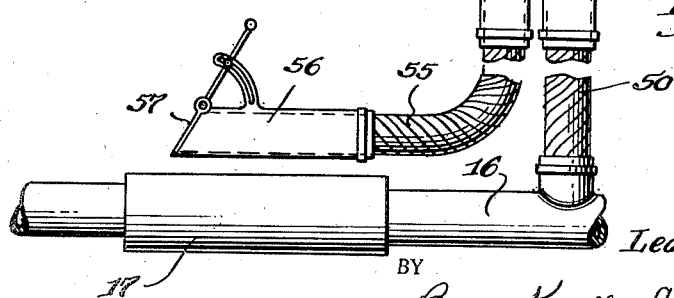
INVENTOR.
Leo E. Gatien
BY
Barnes, Kisselle, Laughlin & Raisch
ATTORNEYS Patented Mar. 10, 1942

2,275,622

UNITED STATES PATENT OFFICE 2,275,622

VEHICLE HEATER

Leo E. Gatien, Ishpeming, Mich.

Application March 4, 1940, Serial No. 322,141

4 Claims. (Cl. 257—137)

This invention relates to a vehicle heater and has particularly to do with a heater for commercial vehicles such as trucks or buses in which a large chamber is to be heated.

With trucks, especially those carrying perishable cargoes, it is essential in cold areas that some heat be provided in the body of the truck. At present it is the practice to use some kind of a charcoal or coal stove in the back portion of the truck to furnish heat. This is a dangerous and troublesome practice. The present invention contemplates a heating apparatus in which the heat from the exhaust gases may be safely utilized to heat the atmosphere of the cargo chamber.

A further object of the invention is to provide a novel means of connecting the exhaust pipe with this heater whereby the heat may be regulated without undue back pressure on the motor.

Other objects and features of the invention, having to do with details of construction and operation, as, for example, the insulation of the heating device and the connections of the exhaust pipe, will be brought out in the following description and claims.

In the drawings:

Fig. 1 is a side elevation of a tractor-trailer truck combination in which the heating device is shown in outline.

Fig. 2 is a similar view of a truck in which the body is connected to the truck chassis illustrating a modified manner of connecting with the exhaust pipe.

Fig. 3 is a view taken on the lines 3—3 of Fig. 1 showing the heater in elevation.

Figs. 4, 5 and 6 are sections on lines 4—4, 5—5 and 6—6, respectively, of Fig. 3.

Fig. 7 is an elevation showing the details of the connection of Fig. 2 between the exhaust pipe and the heater.

Fig. 8 is a sectional view on the lines 8—8 of Fig. 7.

Fig. 9 is a sectional view taken on lines 9—9 of Fig. 3.

Fig. 10 shows a modified construction relating to the connection of the exhaust pipe with the heating unit.

Fig. 11 is a sectional view of the heater showing the use of round tubes instead of square tubes.

Referring to the drawings, in Fig. 1, a truck-trailer is shown at 15 provided with an exhaust pipe 16 and a muffler 17. A trailer body 18 contains the chamber to be heated. A heater within the body is shown generally at 19.

An elevation of the heater 19 is found in Fig. 3. With reference to Fig. 3 and the sections shown in Figs. 4, 5 and 9, the heater is mounted against a wall 20. A U-shaped plate 21 is fastened to the wall to provide an air space between the wall and the heater. A double walled shaft is then mounted on the back plate 21 and has an inner wall 22 and an outer wall 23. These walls form a vertical shaft extending from a point adjacent the floor of the chamber to be heated to a point adjacent the top. Within the inner wall 22 is a U-shaped square cross section tube 24 which is spaced from the plate 21 and wall 22 and the ends of which project outwardly through the chamber wall 20, as shown at 25 and 26 in Fig. 9. Adjacent the floor 27, an aperture is formed in the walls 22 and 23, as shown generally at 28 in Fig. 3. This permits cold air to pass up through the space formed between the walls and the tube 24.

The top of the shafts formed by walls 22 and 23 and plate 21 is closed except for a tubular outlet 30 leading to a fan box 31 in which is mounted a motor and a fan which blow air to the outlet funnel 32. Air dividers 33 help to distribute the air out over the top of the chamber, as it passes from the funnel. Outlet tubes 25 and 26 are each connected to flexible hoses 35 and 36. The hose 36 leads to a connection 37 which, in turn, is connected by a hose 38 through an auxiliary muffler 39 to a tube 40 connected to the exhaust pipe 16. The connection 37 can be any suitable type of connection, with preferably a bayonet slot device, and some means for locking the connection. Hose 35 leads to a point beneath the body where exhaust gases passing through the heater, may be discharged. A connecting plate 41 is used between the tube 40 and the exhaust pipe 16. This plate is also found in Fig. 2 and is shown in detail in Figs. 7 and 8. In order to connect the heater, a rectangular hole 42 is cut in the top of the exhaust pipe and the curved plate 41 is fitted over this hole. Clamping bands 43 hold the plate 41 in place.

A seal is provided by a rectangular curved shim 44 which is provided with a proper internal diameter to fit the exhaust pipe. These shims may be furnished in various sizes so that any exhaust pipe may be fitted. The shim 44 seals the sides and ends of the plate against the pipe so that there will be no leakage. The plate 31 has two outlets 45 and 46 and is also provided with a flap valve 47 which may be manipulated from the outside. This flap valve has two positions; one in which it directs exhaust gases from pipe 16 to outlet 45; and the other where the outlet 45 is closed and the exhaust gases pass directly through the pipe 16.

In the embodiment of Fig. 1, the outlet 46 is plugged since there is only one connection from the plate 41 to the heater. In the embodiment of Fig. 2, where the truck body is mounted directly on the chassis, the outlets 45 and 46 of plate 41 are each connected to tubes leading from the openings 25 and 26 on the heater. Exhaust gases then pass through the heater and back to plate 41 and on through exhaust pipe 16.

A simpler arrangement is shown in Fig. 10 where a direct connection is made by a tube 50 and a removable connection 51 to a bottom outlet 52 on the heater. The other outlet 53 of the heater is connected at 54 to an outlet tube 55 on the end of which is a discharge nozzle 56 provided with an adjustable valve plate 57. The muffler 17 will set up a certain back pressure and this will force exhaust gases through the heater. The opening of valve 57 will control the amount of gas which passes through the heater.

The embodiment shown in Fig. 3 and the various sectional views thereof, is the preferred embodiment since the tube 24 which furnishes the direct heat is insulated from the interior of the truck and, also, from the wall of the truck by the double wall construction and the U plate 21. Air, passing upwardly through the spaces between the walls and the tubes, will keep the outer wall 23 cool enough so that there is no danger of burning if the cargo is in contact with the heater. The U plate 21 prevents an excessive heating of the truck wall which might destroy paint or otherwise cause damage. Simpler constructions may be used. For example, in Fig. 11, a round tube construction is provided with a single wall for the vertical shaft of the heater. The outlets of the U tube may obviously be at the side, as shown in Fig. 1, or at the bottom, as shown in Figs. 2 and 10.

The heater above disclosed may also be used in commercial vehicles, such as buses or airplanes, if a source of exhaust gases is available. The construction is extremely safe since all connections which might leak exhaust fumes are made outside of the chamber which is to be heated. This is important regardless of whether the vehicle is being used for public transportation or for the transportation of food products.

Another important feature of the heater, as above described, is that no back pressure is created on the motor. There is no complicated coil or heat exchange unit through which the gas must pass, it is simply a straight U tube with no back pressure other than that caused by a muffler in the case of Fig. 2.

The above description of the embodiments of my invention are simply illustrative and are not intended to limit the invention which I have defined in the following claims.

What I claim is:

1. In a commercial vehicle heater of the type heated by hot exhaust gases, a heat exchange unit within a chamber of said vehicle to be heated comprising an inner heating shaft, a tube for exhaust gases passing through said shaft, openings formed in the top and bottom of said shaft leading to the interior of the chamber to be heated, an outer heating shaft surrounding said inner shaft and open at each end to said chamber, and means for causing movement of air of said chamber upwardly through said shaft to effect transfer of heat from said tube and said inner shaft to said air and to effect cooling of said outer shaft to prevent burning of the contents of said chamber.

2. In a commercial vehicle heater of the type heated by hot exhaust gases, a heat exchange unit within a chamber of said vehicle to be heated, comprising a vertical air shaft formed by a tubular member within the chamber to be heated and having an opening adjacent the top and bottom of said chamber, a second tubular member within said shaft having ends projecting from said shaft and arranged with respect to said shaft whereby the interior of said second tubular member is sealed from the inside of the shaft and the chamber, an outer heating shaft surrounding said inner shaft and open at each end to said chamber, and means for causing movement of air of said chamber upwardly through said shaft to effect transfer of heat from said tube in said inner shaft to said air, and to effect cooling of said outer shaft to prevent burning of the contents of said chamber.

3. A heater of the type used in connection with the exhaust pipe of a commercial vehicle comprising an elongated substantially vertical air shaft formed by a tubular member within the chamber to be heated, a tube positioned within and extending longitudinally of said shaft and having integral ends projecting from said shaft and from the walls of said chamber, said shaft being provided with openings adjacent each of its ends and said shaft and said tube extending substantially the height of said chamber, means for passing exhaust gases through said tube whereby a heat transfer is effected to air in said shaft from said tube and air is caused to circulate upwardly through said shaft, and means for causing distribution of heated air from said shaft to said chamber comprising a relatively flat, bell mouthed spreader having passages in the mouth thereof directed to a major portion of the area to be heated.

4. A heater of the type used in connection with the exhaust pipe of a commercial vehicle comprising a substantially vertical elongated air shaft formed by a tubular member within the chamber to be heated, a U-shaped tube adapted to radiate heat positioned within and extending longitudinally of said shaft and having integral ends projecting from said shaft and from the walls of said chamber, means to circulate gases from said exhaust pipe through said U-shaped tube whereby a minimum of back pressure is imparted to the gases in said exhaust pipe, said shaft being provided with openings adjacent its top and its bottom to permit the flow of air therethrough in a direction along said tube, and means for causing distribution of heated air from said shaft to said chamber comprising a relatively flat, bell mouthed spreader having passages in the mouth thereof directed to a major portion of the area to be heated.

LEO E. GATIEN.